United States Patent [19]

Vitellaro

[11] 4,378,125
[45] Mar. 29, 1983

[54] HOSE CONSTRUCTION AND METHOD OF MAKING SAME

[75] Inventor: Frank A. Vitellaro, Trenton, N.J.

[73] Assignee: Dayco Corporation, Dayton, Ohio

[21] Appl. No.: 188,205

[22] Filed: Sep. 18, 1980

[51] Int. Cl.³ .............................................. F16L 33/22
[52] U.S. Cl. .................................. 285/242; 285/308; 24/273
[58] Field of Search ................. 285/242, 236, DIG. 4, 285/260, 252, 308; 24/273, 68 R, 69 R, 69 ST, 69 TT

[56] References Cited

U.S. PATENT DOCUMENTS

| | | | |
|---|---|---|---|
| 904,184 | 11/1908 | Dreese | 24/273 |
| 1,229,146 | 6/1917 | Saint Clair | 24/69 TT |
| 1,367,038 | 2/1921 | Gard | 24/273 |
| 1,431,012 | 10/1922 | Kubelka | 24/68 R |
| 2,289,422 | 7/1942 | Grotnes | 24/273 |
| 2,304,911 | 12/1942 | Harpold | 24/273 |
| 3,874,712 | 4/1975 | Watson | 285/236 |
| 4,312,525 | 1/1982 | Kleykamp | 285/236 |

*Primary Examiner*—Thomas F. Callaghan
*Attorney, Agent, or Firm*—Joseph V. Tassone

[57] ABSTRACT

A hose construction, and method of making same, are provided wherein the hose construction comprises a hose having a hose end and a hose clamp assembly fastened to opposite sides of a first arcuate length of the hose end with a second arcuate length of the hose end defining the remaining 360° circumference thereof and with the assembly being movable between an unclamped and a clamped position thereof and in the clamped position employs the second arcuate length of the hose end as clamping means; and, the assembly comprises a first straight member, an L-shaped member, and a simple link connected between the members which cooperate with the members to move the assembly between the unclamped and a clamped positions thereof with optimum simplicity and the assembly has means for locking same in its clamped position.

25 Claims, 15 Drawing Figures

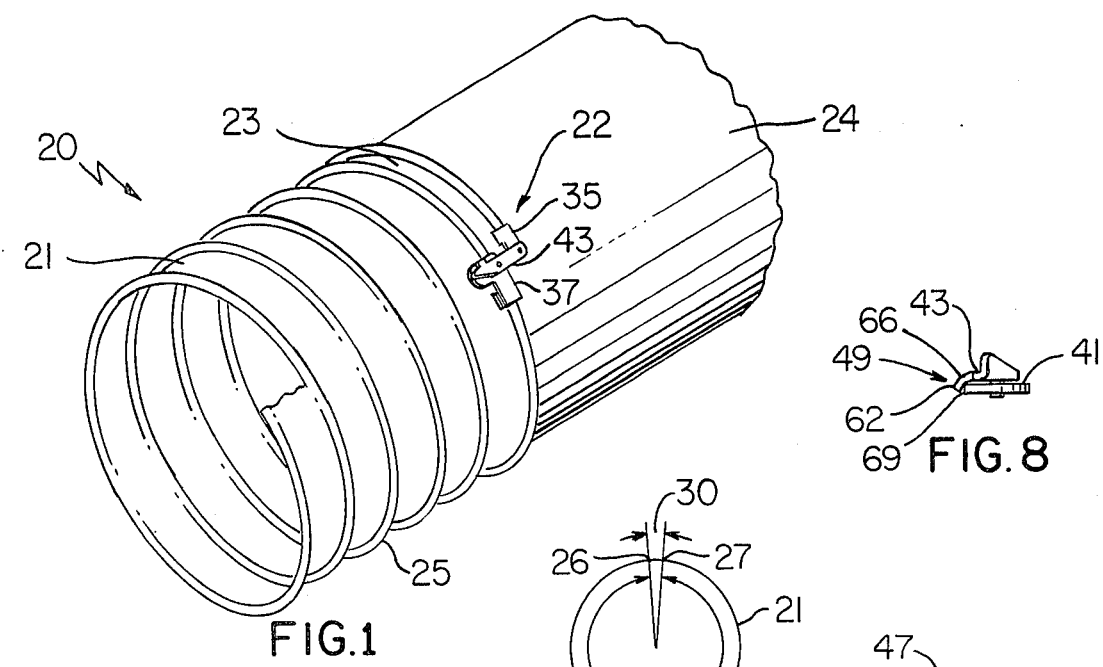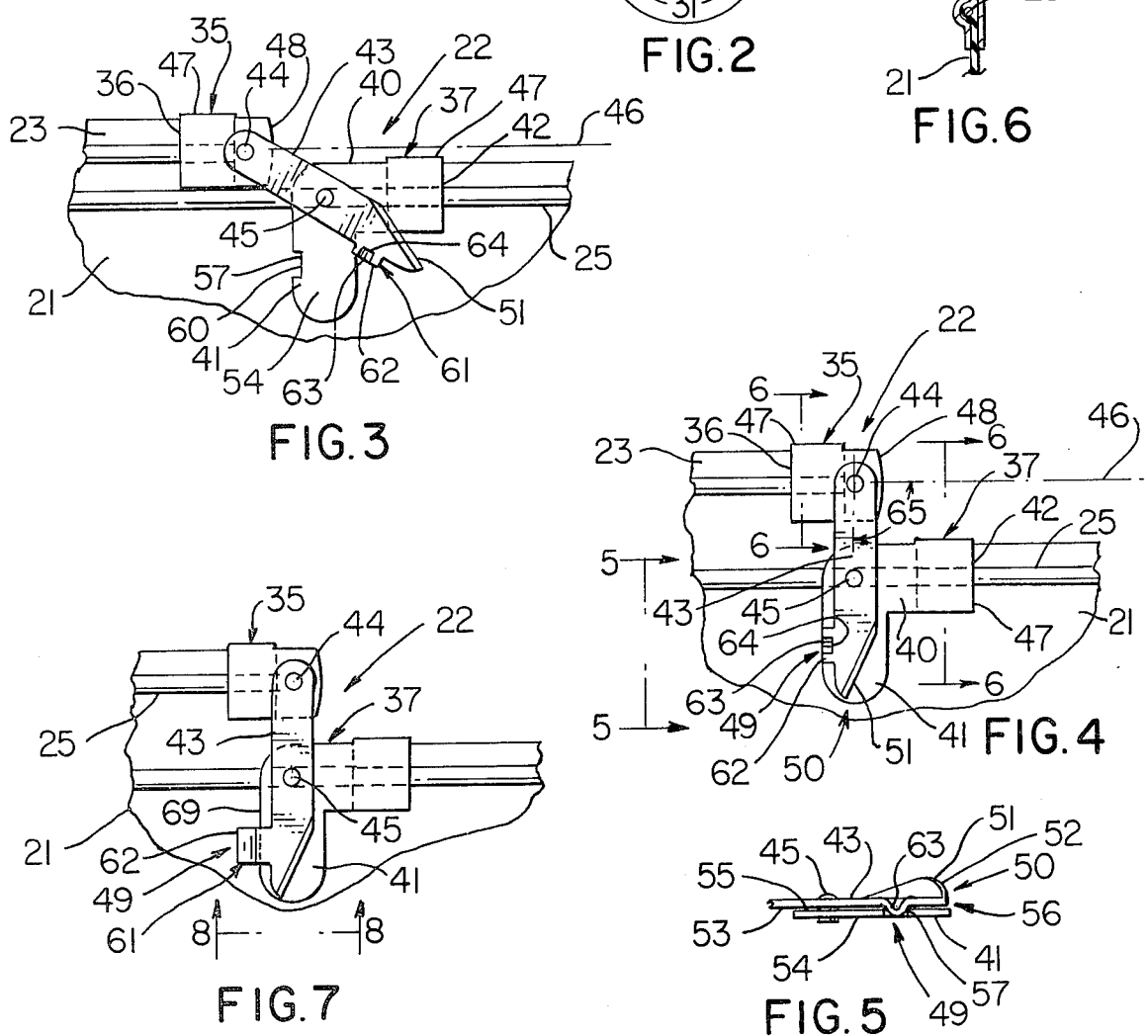

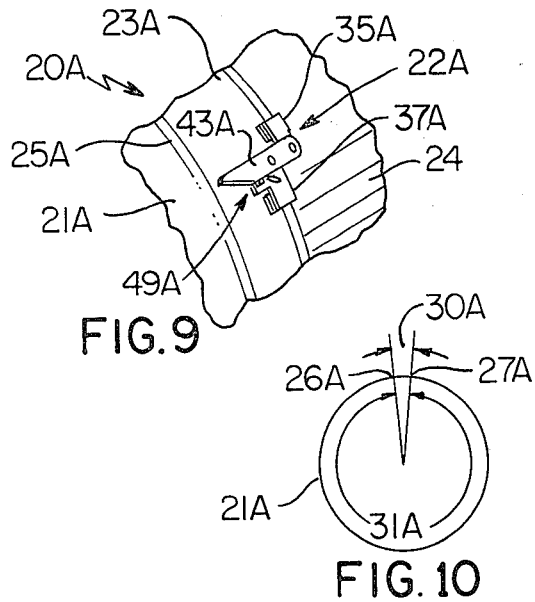
FIG.9
FIG.10
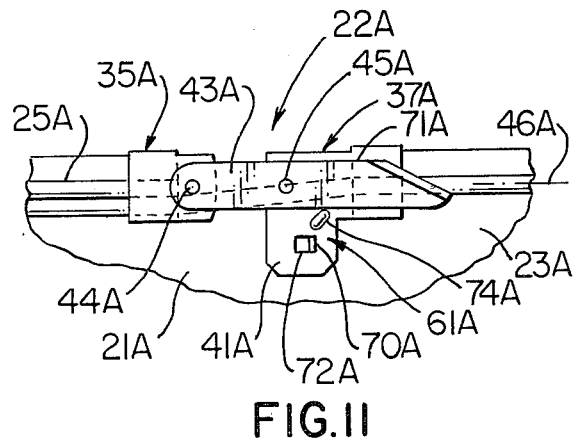
FIG.11
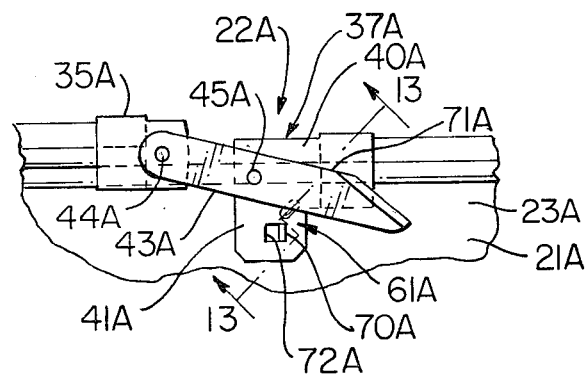
FIG.12
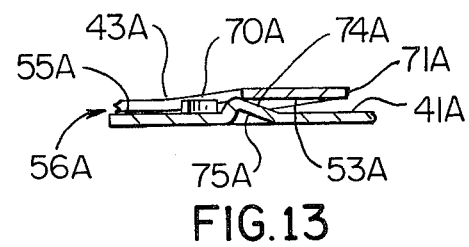
FIG.13
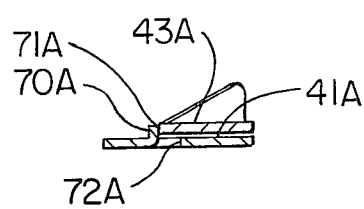
FIG.15
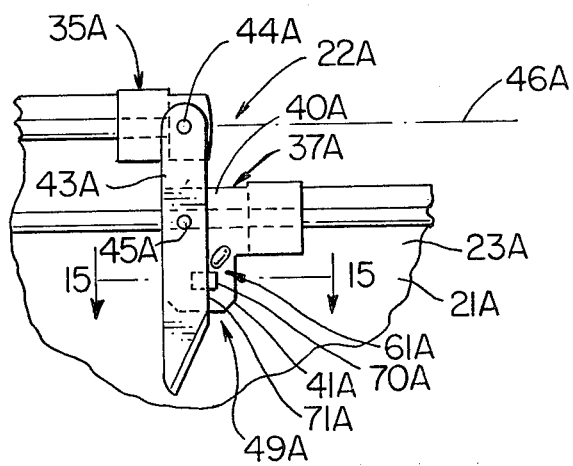
FIG.14

HOSE CONSTRUCTION AND METHOD OF MAKING SAME

BACKGROUND OF THE INVENTION

1. Field of the Invention

This invention relates to a polymeric hose construction having an improved hose clamp assembly and method of making same.

2. Prior Art Statement

Flexible hose constructions made primarily of polymeric material, and of both the reinforced and unreinforced types, are well known in the art. These hose constructions are generally fastened in fluid flow communication with tubular structures such as tubular conduits, pipes, or the like, using separate adjustable bands each of which is disposed concentrically around on associated hose end clamping same against an associated tubular structure.

In many applications, such as automotive air induction and ventilation systems, it is desirable to provide a polymeric hose construction which has a hose clamp structure provided as an integral part thereof; and, typical polymeric hose constructions of this type will now be presented.

For example, it has been proposed in U.S. Patent application Ser. No. 137,165, filed Apr. 4, 1980, now U.S. Pat. No. 4,306,740, to provide a hose construction which employs a hose clamp structure comprised of a pair of separate cooperating interconnectible members each having a plurality of teeth adapted for interconnecting engagement with the members upon being fastened to an associated hose end and interconnected therearound extending substantially over a first arcuate length of the hose end with a second arcuate length of the hose end completing the remaining 360° circumference of the hose end and wherein the members when connected to the hose end employ the second arcuate length of the hose end as clamping means with the connected members and second arcuate length cooperating to define an annular construction enabling the hose end to be clamped around an associated tubular structure.

It has also been proposed in U.S. Pat. No. 3,874,712 to provide a hose construction which uses a clamp which is crimped against an integral helical wire of the hose construction wherein the clamp uses an overcenter toggle link for tightening purposes.

However, the manufacture of polymeric hose constructions is highly competitive and especially for a hose construction, which employs at least one hose clamp assembly as an integral part of a hose end of its hose, the need exists for such a hose construction which is economical and easy to install. The need also exists for a simple and economical hose clamp assembly which may be readily installed on an associated end of a hose to define such a hose construction.

SUMMARY

It is a feature of this invention to provide a hose construction comprising a hose having a hose end and a hose clamp assembly fastened to opposite sides of a first arcuate length of the hose end with a second arcuate length of the hose end defining the remaining 360° circumference thereof, and with the assembly being movable between an unclamped and a clamped position thereof and in the clamped position employs the second arcuate length of a hose end as a clamping means.

Another feature of this invention is to provide a hose construction of the character mentioned wherein the hose clamp assembly is made of simple sheet metal parts.

Another feature of this invention is to provide a hose construction of the character mentioned wherein the hose thereof is made primarily of a polymeric material and may have an integral helically wound reinforcing wire.

Another feature of this invention is to provide a hose construction of the character mentioned wherein the hose clamp assembly thereof comprises a first member, means attaching the first member to the hose end at one of the opposite sides of the above-described first arcuate length, a substantially L-shaped member having a pair of legs extending transverse each other, means attaching one of the legs of the L-shaped member to the hose end at the other of the opposite sides of the first arcuate length, and a simple connecting link which has a first fastener pivotally fastening one end portion of the connecting link to the first member and a second fastener pivotally fastening a center portion of the connecting link to the L-shaped member and wherein such hose clamp assembly has locking means in said L-shaped member and connecting link for locking same and hence the entire assembly in the clamped position.

Another feature of this invention is to provide a hose construction of the character mentioned wherein the first and second fasteners of the hose clamp assembly are constructed and arranged so that with the assembly in an unclamped condition the connecting link is disposed substantially in alignment with the one leg of the L-shaped member along a rectilinear path, and with the assembly in a clamped position the connecting link is disposed perpendicular to the rectilinear path and substantially parallel to the other of the pair of legs of the L-shaped member.

Another feature of this invention is to provide a hose construction of the character mentioned wherein the first member of the hose clamp assembly is a straight member and with the assembly in its unclamped position the connecting link thereof is also disposed substantially in alignment with the straight member along the rectilinear path, and in the clamped position the connecting link serves to displace the one leg of the L-shaped member transverse the rectilinear path.

Another feature of this invention is to provide a hose construction of the character mentioned wherein the first and second fasteners of the hose clamp assembly are disposed in substantial alignment with the rectilinear path with the assembly in its unclamped position, and the first and second fasteners are disposed substantially perpendicular to the rectilinear path with the assembly in its clamped position.

Another feature of this invention is to provide a hose construction of the character mentioned wherein each of the straight member and L-shaped member has a U-shaped portion which is adapted to be clamped around and against a part of the hose end.

Another feature of this invention is to provide a hose construction of the character mentioned wherein the hose portion thereof is a hose construction reinforced by a helically wound wire and the straight member and L-shaped member of the hose clamp assembly are clamped around and against the reinforcing wire at the above-described hose end.

Another feature of this invention is to provide a hose construction of the character mentioned having simple grasping means for grasping the connecting link of the clamp assembly to facilitate movement of the connecting link to define the unclamped and clamped positions of the hose clamp assembly.

Another feature of this invention is to provide a hose construction of the character mentioned having simple locking means for locking the clamp assembly in its clamped position.

Another feature of this invention is to provide an improved hose clamp assembly which is described above as comprising the improved hose construction.

Another feature of this invention is to provide an improved method of making a hose construction of the character mentioned.

Therefore, it is an object of this invention to provide an improved hose construction, improved hose clamp assembly for a hose construction, and improved method of making a hose construction having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a fragmentary perspective view illustrating an exemplary embodiment of the hose construction of this invention which employs an exemplary embodiment of the hose clamp assembly of this invention around an end of the hose of the hose construction and with the hose end being fastened by its hose clamp assembly around an associated tubular structure;

FIG. 2 is a primarily schematic view highlighting the manner in which the hose clamp assembly of this invention is fastened to opposite sides of a first arcuate length of a hose end of a polymeric hose construction (with such arcuate length being exaggerated in size) and illustrating that a second arcuate length of the hose end defines the remaining 360° circumference of such hose end;

FIG. 3 is a fragmentary view of a part of the hose end illustrating the hose clamp assembly of FIG. 1 drawn to an enlarged scale and in a primarily unclamped position;

FIG. 4 is a view similar to FIG. 3 illustrating the hose clamp assembly in a clamped position;

FIG. 5 is a fragmentary view taken essentially on the line 5—5 of FIG. 4;

FIG. 6 is a typical fragmentary cross-sectional view which is substantially the same whether taken on either of the lines 6—6 of FIG. 4;

FIG. 7 is a view similar to FIG. 4 illustrating a modification of the hose clamp assembly of FIGS. 1-6;

FIG. 8 is a view taken essentially on the line 8—8 of FIG. 7 and showing only the locking means of the assembly of FIG. 7;

FIG. 9 is a perspective view illustrating a fragmentary part of another exemplary embodiment of the hose construction of this invention which employs another exemplary embodiment of the hose clamp assembly of this invention around an end of the hose of the hose construction and with the hose end being fastened by its hose clamp assembly around an associated tubular structure which is also shown fragmentarily;

FIG. 10 is a view similar to FIG. 2 for the hose clamp assembly of FIG. 9;

FIG. 11 is a fragmentary view of a part of an associated hose end illustrating the hose clamp assembly of FIG. 9 drawn to an enlarged scale and in an unclamped position;

FIG. 12 is a view similar to FIG. 11 illustrating the clamp assembly of FIG. 9 partially moved toward its clamped position;

FIG. 13 is a fragmentary cross-sectional view taken essentially on the line 13—13 of FIG. 12;

FIG. 14 is a view similar to FIG. 4 illustrating the hose clamp assembly of FIG. 9 in its clamped position; and FIG. 15 is a view taken essentially on the line 15—15 of FIG. 14.

DESCRIPTION OF ILLUSTRATED EMBODIMENTS

Reference is now made to FIG. 1 of the drawings which illustrates one exemplary embodiment of the hose construction of this invention which is designated generally by the reference numeral 20; and, the hose construction 20 comprises a flexible hose 21 made primarily of polymeric material and a hose clamp assembly which is designated generally by the reference numeral 22 and is made in accordance with the teachings of this invention. The flexible hose 21 has a hose end 23 and the hose clamp assembly 22 is provided as an integral part of the hose construction 21 by being fastened to such hose end 23 for the purpose of clamping or fastening such end and hence the hose construction 21 on an associated tubular structure 24 which may be in the form of a pipe, conduit, or the like. In this example of the invention a hose clamp assembly 22 is illustrated at only one end of the hose construction 20; however, it is to be understood that the hose clamp assembly 22 may be provided at opposite ends of a hose construction for some applications.

The flexible hose 21 may be any suitable type known in the art and as indicated earlier may be made primarily of polymeric material. The hose 21 preferably comprises reinforcing means in the form of a helically wound reinforcing wire 25.

The hose 21 is preferably made employing an elongated ribbon or strip of polymeric material, such as a rubber compound, which is helically wound with associated edge portions in overlapped relation and with the wire 25 being helically wound with the required pitch so that it is interposed between the overlapped edges of the strip and in concealed relation. The wire 25 extends along the entire axial length of the hose construction 21 and provides reinforcement therefor; and, the wire 25 assures that the hose 21 may be used in vacuum applications or similar applications in a noncollapsing manner.

The hose clamp assembly 22 is particularly adapted to be fastened at opposite sides 26 and 27 (FIG. 2) of a first arcuate length 30 of the hose end 23, with such arcuate length being exaggerated in size, as mentioned in the description of the FIGS., to facilitate an understanding of the invention. A second arcuate length 31 of the hose end 23 defines the remaining 360° circumference of such hose end. The hose clamp assembly 22 is movable between an unclamped and a clamped position thereof and FIG. 3 illustrates the assembly in a basically unclamped position while FIG. 4 illustrates the assembly in its clamped position.

In the clamped position of FIG. 4, the assembly 22 employs the second arcuate length 31 of the hose end 23 as clamping means; and, as indicated in the prior art statement of this specification it is known in the art to employ a portion of the circumference of a hose end as clamping means. However, the hose clamp assembly of this invention is of optimum simplicity and may be readily produced at minimum cost to provide not only a hose clamp assembly but also an overall hose construction employing such clamp assembly which is cost and performance competitive in numerous applications, including automotive applications.

The assembly 22 comprises a first member 35 (FIG. 3) and attaching means 36 for attaching the first member 35 to the hose end 23 at one side of the first arcuate length, and in this example to the side 26 thereof as illustrated in FIG. 2. The attaching means 36 serves to attach the member 35 to the hose end 23 and in particular to the terminal end portion of the last helical turn of the wire 25 at end 23.

The hose clamp assembly 22 also comprises a substantially L-shaped member 37 which has a pair of legs 40 and 41 extending transverse each other and it will be seen that the member 37 has attaching means 42 comprising one of the legs and in particular the leg 40 to the opposite side 27 of the arcuate length 30. The attaching means 42 serves to attach the leg 40 of member 37 to the hose end 23 and in particular to an inner portion of the last helical turn of the wire 25 at end 23.

The hose clamp assembly 22 also has a connecting link 43 and a first fastener in the form of a fastening rivet 44 pivotally fastening one end portion of the connecting link 43 to the member 35 and a second fastener 45 pivotally fastening a central portion of the connecting link 43 to the L-shaped member 37 near the bight of its legs 40 and 41. The assembly 22 also has cooperating locking means designated generally by the reference numeral 49 in FIG. 4 acting between the L-shaped member 37 and the connecting link 43 for locking same and hence the assembly 22 in its clamped position, which is the position of FIGS. 1 and 4.

The first and second fasteners, 44 and 45 respectively, are constructed and arranged so that with the assembly 22 in an unclamped position the connecting link 43 is disposed substantially in alignment with the leg 40 of the L-shaped member 37 along a rectilinear path indicated by a dot dash line 46 in FIGS. 3 and 4. With the assembly 22 in its clamped position the connecting link 43 is disposed substantially perpendicular the rectilinear path 46 and substantially parallel to the leg 41 of the L-shaped member 37.

The member 35 is essentially a straight member and with the assembly 22 in its unclamped position the connecting link 43 is disposed substantially in alignment with the straight member along the rectilinear path 46. Once the assembly 22 is in its clamped position of FIG. 4, the connecting link 43 serves to displace the leg 40 of the L-shaped member 37 in a direction transverse, i.e., perpendicular, the rectilinear path 46.

The fasteners 44 and 45 are disposed in substantial alignment with the rectilinear path 46 with the assembly 22 in its unclamped position in FIG. 3 and such fasteners are disposed substantially perpendicular the rectilinear path with such assembly in its clamped position of FIG. 4. Stated otherwise, a straight line drawn through the centers of the fasteners 44 and 45 is in substantial alignment (practically coincides with) the rectilinear path 46 with the assembly in its fully unclamped position and such a straight line is disposed substantially perpendicular to the path 46 with the assembly 22 in its clamped position. As will be readily apparent from the construction of the assembly, the amount that the leg 40 of the L-shaped member 37 is displaced away from the above described rectilinear path 46 in moving the clamp assembly from its unclamped to its clamped position is defined by the straight line distance between fasteners 44 and 45.

As seen in FIGS. 3 and 6 of the drawings the member 35 has a U-shaped portion 47 and an extension tab 48 extending outwardly therefrom. The U-shaped portion 47 is particularly adapted to be clamped around and against a part of the hose end 23 and in particular around the terminal end portion of the last turn of the helical reinforcing wire 25 comprising the hose end 23. The extension 48 has an opening therein and the fastener 44 extends through such opening and a cooperating opening in an end portion of the connecting link 43 thereby pivotally fastening the end portion of the connecting link to the extension 48 and hence member 35.

The L-shaped member 37 has a U-shaped portion, which is also designated by the reference numeral 47, extending outwardly from one leg thereof and in particular from its leg 40. The U-shaped portion 47 of the L-shaped member 37 is particularly adapted to be clamped around and against an associated part of the hose end 23 and in particular around the inner portion of the last helical turn of the reinforcing wire 25 which comprises the hose end 23. The L-shaped member 37 also has an opening in its central part and the fastener 45 extends through such opening and a cooperating opening in the central part of the connecting link 43 to thereby pivotally fasten the link 43 to member 37.

Thus, it is seen that with the straight member 35 clamped at the side 26 of the arcuate length 30 and the L-shaped member 37 clamped at the side 27 of the arcuate length 30, the assembly 22 operates such that upon operating same from its unclamped position to its clamped position of FIG. 4 the hose end 23 is, in essence, decreased in circumferential length or dimension. This is achieved by effectively eliminating the arcuate length 30 whereby the end 23 may be clamped around an associated tubular structure 24 in a simple and efficient manner.

The improved hose clamp assembly 22 has grasping means designated generally by the reference numeral 50 (FIGS. 4 and 5) for grasping the connecting link 43 to facilitate movements thereof between the unclamped and clamped positions. Although any suitable grasping means may be provided, in this example of the invention the grasping means 50 comprises a flange 51 extending from the outer portion of the connecting link 43 and defined as an integral part thereof. The flange 51 is defined by a bent end portion of the connecting link 43 with the bent end portion having a smooth arcuate edge 52 as illustrated in FIG. 5.

Referring again to FIGS. 3 and 4 of the drawings, it is seen that the connecting link 43 has a flat sheet-like central portion and a first substantially planar surface which is designated generally by the reference numeral 53 in FIG. 5. The L-shaped member 37 has at least a portion of its leg 40 and the other leg 41 defined as a flat sheet-like portion 54 which has a second substantially planar surface 55, also illustrated in FIG. 5. The planar surfaces 53 and 55 are adapted to be disposed facing each other and preferably against each other on a common interface as shown at 56.

As previously indicated the hose clamp assembly 22 has locking means 49 provided as an integral part thereof and such locking means comprises a projection extending from one of the planar surfaces and a retaining edge defining an edge of the other of the planar surfaces. In the embodiment of FIGS. 1-6 the locking means 49 comprises a notch 57 (FIG. 3) in an edge portin of the leg 41 defining a retaining edge 60 and the projection means of the lock means comprises projection means designated generally by the reference numeral 61 in the connecting link 43 with such projection means 61 being adapted to engage the retaining edge 60. The projection means 61 comprises a tab 62 extending from an edge portion of the connecting link 43 and a projection, in the form of a V-shaped projection 63 shown in FIG. 5, extending from the tab 62. The V-shaped projection 63 having an inner edge 64 (FIG. 4) which is adapted to engage the retaining edge 60.

The assembly 22 is such that once it is in its clamped position of FIG. 4, the inner edge 64 of the V-shaped projection 63 engages the retaining edge 60 and serves to lock the link 43 in its clamped position. In the clamped position of FIG. 4, a line extending through centers of the fasteners 44 and 45 is disposed at an angle 65° of 90° to the rectilinear path 46 and preferably the angle 65 is at least slightly greater than 90°.

A modification of the hose clamp assembly of FIGS. 1-6 is illustrated in FIGS. 7 and 8 of the drawings and also designated by the reference numeral 22. In the modification of FIGS. 7 and 8 the retaining edge of the locking means 49 is provided as an outer edge 69 of leg 41, without a notch in the leg 41. It will also be seen that the projection means 61 also comprises a tab 62 which extends from the connecting link 43. The tab has a rounded or arcuate configuration 66 as shown in FIG. 8. The inside surface of the tab 62 engages the retaining edge 69 and locks the connecting link 43 in position to thereby lock the members 35 and 37 together. In all other respects the modification of the hose clamp assembly 22 of FIGS. 7 and 8 is identical to the hose clamp assembly of FIGS. 1-6.

Another exemplary embodiment of the hose construction of this invention is illustrated in FIGS. 9-15 of the drawings. The hose construction of FIGS. 9-15 is very similar to the hose construction illustrated in FIGS. 1-6 therefore, such hose construction will be designated by the reference numeral 20A and representative parts of the hose construction which are similar to corresponding parts of the hose construction 20 will be designated in the drawings by the same reference numerals as in the hose construction 20 (whether or not such representative parts are mentioned in the specification) followed by the letter designation A and not described again in detail. Basically the only difference between the hose construction 20A and hose construction 20 is in another embodiment of the hose clamp assembly comprising this invention and used with construction 20A and such assembly will be designated by the reference numeral 22A. The assembly 22A is also similar to assembly 22 and only those component parts of the hose clamp assembly 22A which are substantially different from corresponding parts of the hose clamp assembly 22 will be designated by a new reference numeral which is also followed by the letter designation A and described in detail.

The hose construction 20A comprises a flexible polymeric hose 21A which is also reinforced by a helically wound reinforcing wire 25A. The hose construction 20A has a hose end 23A which is adapted to be fastened to tubular structure 24.

The assembly 22A is fastened at opposite sides 26A and 27A of a first arcuate length 30A of the hose end 23A with an arcuate length 31A defining the remaining 360° circumference of such hose end, and in a similar manner as previously described for the hose clamp assembly 22 and hose end 23 of hose construction 20. The assembly 22A is also movable between an unclamped and clamped position thereof and in the clamped position employs the arcuate length 31A of the hose end 23A as clamping means.

The hose clamp assembly 22A differs from the hose clamp assembly 22 primarily in the locking means 49A thereof, FIGS. 12-13. In the assembly 22A the connecting link 43A has a flat sheet-like central portion and a first substantially planar surface 53A as illustrated in FIG. 13. The L-shaped member 37A also has at least a portion of its one leg 40A and its other leg 41A defined as a flat sheet-like portion which will be referred to as a second substantially planar surface 55A. The planar surfaces 53A and 55A face each other and are preferably disposed against each other on a common interface as shown at 56A.

The locking means 49A comprises projection means 61A from one of the planar surfaces and a retaining edge on the other of the planar surfaces. In this example the projection means 61A comprises a rectangular projection 70A extending from the planar surface 55A toward the planar surface 53A; and, the retaining edge comprises an edge 71A of the connecting link 43A. Thus, it is seen that the projection and retaining edge of assembly 22A are provided on members which are the reverse of the members used to provide these components on assembly 22.

The rectangular projection 70A is defined by a roughly U-shaped slit 72A (FIG. 11) in the leg 41A of the L-shaped member 37A thereby defining a rectangular part within the confines of the slit 72A. The rectangular part is bent perpendicular to the planar surface 55A to define the rectangular projection 70A previously mentioned.

The hose clamp assembly 22A also has a cam surface 74A (FIG. 13) defined in the leg 41A and extending from the planar surface 55A in the same direction as the rectangular projection 70A. The cam surface 74A enables the connecting link 43A to be cammed away from the planar surface 55A to facilitate movement of its retaining edge 71A over an outermost surface of the rectangular projection 70A. The cam surface 74A is defined by an outwardly convex surface of an integral dimple 75A in the leg 41A and it will be seen that such integral dimple has a substantially oblong configuration.

In a similar manner as previously described for the assembly 22, the first member 35A is straight member and with the assembly 22A in the unclamped position illustrated in FIG. 11 of the drawings, the connecting link 43A thereof is disposed substantially in alignment with the straight member 35A along the rectilinear path 46A. In the clamped position of the assembly 22A the connecting link serves to displace the leg 40A of the L-shaped member 37A as illustrated in FIG. 14 in a direction transverse, i.e., perpendicular to the rectilinear path 46A, by a distance (as previously described) which is equal the distance between the fasteners 44A and 45A in the connecting link 43A.

The fasteners 44A and 45A are disposed in substantial alignment with the rectilinear path 46A with the assembly in the unclamped position of FIG. 11. With the assembly 22A in its clamped position of FIG. 14, such fasteners are disposed substantially perpendicular with the rectilinear path 46A. As in the case of the clamp assembly 22, the fasteners 44A and 45A are preferably disposed so that with the assembly 22A in its clamped position a line centrally through the fasteners is disposed at an angle of 90° with the rectilinear path 46A and preferably such angle is greater than 90°.

The component portions of each clamp assembly 22 and 22A may be made of suitable materials as known in the art. Preferably such component portions are made of metallic materials. In particular, the components 35, 37, and 43 are preferably made of sheet metal with fasteners 44 and 45 being in the form of metal rivets. Similarly, the components 35A, 37A, and 43A are also preferably made of sheet metal with the fasteners 44A and 45A also being in the form of metal rivets.

The hose 21 of the hose construction 20 and the hose 21A of the hose construction 20A are preferably made of polymeric material, such as rubber, as previously mentioned. However, any suitable polymeric material may be used, including synthetic plastic material. In addition, each hose 21 and 21A is preferably made by helically winding a strip of polymeric material, as is known in the art. Also, the reinforcing means in each hose is preferably in the form of a helically wound reinforcing wire 25 or 25A made of metal, such as ferrous metal, for example.

Each hose clamp assembly 22 and 22A has been illustrated and described herein as being in the form of a two position hose clamp assembly defined as an unclamped position and a clamped position. However, it is to be understood that the assembly of this invention may have an unclamped position and a plurality of clamped positions. Each clamped position would be similar to each clamped position previously described and would be provided with an associated locking means essentially as described previously in this specification.

While present exemplary embodiments of this invention, and methods of practicing the same, have been illustrated and described, it will be recognized that this invention may be otherwise variously embodied and practiced within the scope of the following claims.

What is claimed is:

1. In a hose construction comprising a hose having a hose end and a hose clamp assembly attached to opposite sides of a first arcuate length of said hose end with a second arcuate length of said hose end defining the remaining 360° circumference thereof, said assembly being movable between an unclamped and a clamped position thereof and in said clamped position employs said second arcuate length of said hose end as clamping means, the improvement in which said assembly comprises, a first member, means attaching said first member to said hose end at one of said opposite sides of said first arcuate length, a substantially L-shaped member having a pair of legs extending transverse each other, means attaching one of said legs to said hose end at the other of said opposite sides of said first arcuate length, a connecting link, a first fastener pivotally fastening one end portion of said connecting link to said first member, a second fastener pivotally fastening a central portion of said connecting link to said L-shaped member, and cooperating locking means in said L-shaped member and connecting link for locking same and hence said assembly in said clamped position, said first and second fasteners being constructed and arranged so that with said assembly in an unclamped position said connecting link is disposed substantially in alignment with said one leg and said first member along a rectilinear path and with said assembly in a clamped position said connecting link is disposed perpendicular to said rectilinear path and substantially parallel to the other of said pair of legs of said L-shaped member.

2. A hose construction as set forth in claim 1 in which said first member is a straight member and with said assembly in said clamped position said connecting link serves to displace said one leg transverse said rectilinear path.

3. A hose construction as set forth in claim 2 in which said first and second fasteners are disposed in substantial alignment with said rectilinear path with said assembly in said unclamped position and said first and second fasteners are disposed substantially perpendicular said rectilinear path with said assembly in said clamped position.

4. A hose construction as set forth in claim 3 in which said straight member has a U-shaped portion and an extension extending outwardly therefrom, said U-shaped portion of said first member defining said means attaching said first member and being adapted to be clamped around and against a part of said hose end.

5. A hose construction as set forth in claim 3 in which said L-shaped member has a U-shaped portion extending outwardly from said one leg thereof, said U-shaped portion of said L-shaped member defining said means attaching said one leg and being adapted to be clamped around and against an associated part of said hose end.

6. A hose construction as set forth in claim 3 in which said first and second fasteners are defined as fastening rivets.

7. A hose construction as set forth in claim 3 and further comprising grasping means for grasping said connecting link to facilitate movements thereof between said unclamped and clamped positions.

8. A hose construction as set forth in claim 7 in which said grasping means comprises a flange extending from said connecting link as an integral part thereof.

9. A hose construction as set forth in claim 8 in which said flange is defined by a bent end portion of said connecting link, said bent end portion having a smooth arcuate edge.

10. A hose construction as set forth in claim 3 in which said connecting link has a flat sheet-like central portion and a first substantially planar surface, said L-shaped member has at least a portion of said one leg and said other leg defined as a flat sheet-like portion which has a second substantially planar surface, said planar surfaces being disposed against each other on a common interface.

11. A hose construction as set forth in claim 10 in which said locking means comprises projection means extending from one of said planar surfaces and a retaining edge defining an edge of the other of said planar surfaces.

12. A hose construction as set forth in claim 11 in which said locking means comprises a notch in an edge portion of said other leg defining said retaining edge and said projection means comprises projection means in said connecting link adapted to engage said retaining edge.

13. A hose construction as set forth in claim 12 in which said projection means comprises a tab extending from an edge portion of said connecting link and a projection extending from said tab which is adapted to engage said retaining edge.

14. A hose construction as set forth in claim 13 in which said projection comprises a V-shaped projection having an inner edge defined by the cooperating inner edges of the legs of the V, said inner edge being adapted to engage said retaining edge.

15. A hose construction as set forth in claim 13 in which said projection comprises an arcuate lip extending from an outer portion of said tab.

16. A hose construction as set forth in claim 11 in which said projection means comprises a rectangular projection extending from said second planar surface toward said first planar surface and said retaining edge comprises an edge of said connecting link.

17. A hose construction as set forth in claim 16 in which said rectangular projection is defined by a roughly U-shaped slit in said other leg defining a rectangular part within the confines of said slit, said part being bent perpendicular to said second planar surface to define said rectangular projection.

18. A hose construction as set forth in claim 16 and further comprising a cam surface defined in said other leg and extending from said second planar surface in the same direction as said rectangular projection, said cam surface enabling said connecting link to be cammed away from said second planar surface to facilitate movement of its retaining edge over an outermost surface of said rectangular projection.

19. A hose construction as set forth in claim 18 in which said cam surface is defined as an outwardly convex surface of an integral dimple in said other leg.

20. A hose construction as set forth in claim 19 in which said integral dimple has a substantially oblong configuration.

21. In a hose clamp assembly for a hose construction which has a hose end wherein said assembly is adapted to be attached at opposite sides of a first arcuate length of said hose end and wherein a second arcuate length of said hose end defines the remaining 360° circumference thereof, said assembly once fastened to said hose end being movable between an unclamped and a clamped position thereof and in said clamped position employs said second arcuate length of said hose end as clamping means, the improvement in said assembly comprising, a first member, means for attaching said first member to said hose end at one of said opposite sides of said first arcuate length, a substantially L-shaped member having a pair of legs extending transverse each other, means for attaching one of said legs to said hose end at the other of said opposite sides of said first arcuate length, a connecting link, a first fastener pivotally fastening one end portion of said connecting link to said first member, a second fastener pivotally fastening a central portion of said connecting link to said L-shaped member and cooperating locking means acting between said L-shaped member and connecting link for locking same and hence said assembly in said clamped position, said first and second fasteners being constructed and arranged so that with said assembly in an unclamped position said connecting link is disposed substantially in alignment with said one leg and said first member along a rectilinear path and with said assembly in a clamped position said connecting link is disposed perpendicular to said rectilinear path and substantially parallel to the other of said pair of legs of said L-shaped member.

22. A hose clamp assembly as set forth in claim 21 in which said first member is a straight member and with said assembly in said clamped position said connecting link serves to displace said one leg transverse said rectilinear path.

23. A hose clamp assembly as set forth in claim 22 in which said first and second fasteners are disposed in substantial alignment with said rectilinear path with said assembly in said unclamped position and said first and second fasteners are disposed substantially perpendicular said rectilinear path with said assembly in a clamped position.

24. A hose clamp assembly as set forth in claim 23 in which said straight member has a U-shaped portion and an extension extending outwardly therefrom with said U-shaped portion being adapted to be clamped around and against a part of said hose end and defining said attaching means for said first member, and said L-shaped member also has a U-shaped portion extending outwardly from said one leg thereof with said U-shaped portion of said L-shaped member also being adapted to be clamped around and against an associated part of said hose end and defining said attaching means for said one leg of said L-shaped member.

25. A hose clamp assembly as set forth in claim 23 and further comprising grasping means for grasping said connecting link to facilitate movements thereof between said unclamped and clamped positions.

* * * * *